United States Patent [19]
Urlacher

[11] Patent Number: 5,052,093
[45] Date of Patent: Oct. 1, 1991

[54] APPARATUS FOR SEATING AN ELONGATED FLEXIBLE SPLINE IN A WINDOW FRAME TO SECURE A FLEXIBLE SCREEN THERETO

[75] Inventor: Dennis P. Urlacher, Mandan, N. Dak.

[73] Assignee: North Country Thermal Line, Inc., Mandan, N. Dak.

[21] Appl. No.: 503,211

[22] Filed: Apr. 2, 1990

[51] Int. Cl.5 ..................... B23P 19/02
[52] U.S. Cl. ..................... 29/235
[58] Field of Search ..................... 29/235, 451, 460; 83/614; 140/109; 52/741, 743; 404/64, 65, 74, 87; 7/103, 105, 158; 81/488; 30/162, 335

[56] References Cited

U.S. PATENT DOCUMENTS

| | | | |
|---|---|---|---|
| 2,638,131 | 5/1953 | Rohs | 29/235 |
| 2,835,037 | 5/1958 | Middents | 83/614 |
| 3,779,119 | 12/1973 | Broides | 83/614 |
| 3,828,832 | 8/1974 | Hartman | 29/235 |
| 4,021,909 | 5/1977 | Bollmer | 29/243.58 |

*Primary Examiner*—Robert C. Watson
*Attorney, Agent, or Firm*—Zarley, McKee, Thomte, Voorhees & Sease

[57] ABSTRACT

A spline seating carriage is longitudinally movably mounted at one side edge of a support table upon which the window screen is positioned. The flexible screen material is layered over the screen frame and the flexible spline is positioned over the groove in the screen frame. A spline roller is movably mounted on the carriage and may be moved downwardly into a spline engaging position to force the spline downwardly into the groove in the screen frame to secure the screen material thereto. The carriage is moved along the length of the screen frame to seat the spline along the entire periphery of the frame.

1 Claim, 4 Drawing Sheets

APPARATUS FOR SEATING AN ELONGATED FLEXIBLE SPLINE IN A WINDOW FRAME TO SECURE A FLEXIBLE SCREEN THERETO

BACKGROUND OF THE INVENTION

Conventional windows for homes or the like normally include a screen which consists of an aluminum frame having a fiber mesh screen material held in place with a flexible spline. The screen material is layered over the frame and the spline is rolled into a groove on the screen frame to tightly secure the screen material to the frame. Heretofore, the rolling procedure or spline positioning procedure was accomplished by a small hand-held roller. In order to seat the spline in the prior art method, a great amount of arm pressure was required. The required amount of arm pressure made it difficult for some employees to perform the same and many employees have developed tendonitis which resulted in lost production time and increased workers compensation claims.

It is therefore a principal object of the invention to provide an apparatus for seating an elongated flexible spline in a window screen frame to secure a flexible screen material thereto.

Yet another object of the invention is to provide an apparatus for seating an elongated flexible spline in a window screen frame to secure a flexible screen material thereto which does not require the exertion of arm pressure to accomplish the same.

Still another object of the invention is to provide an apparatus for seating an elongated flexible spline in a window screen frame which is more efficient than methods heretofore employed.

Yet another object of the invention is to provide an apparatus for seating an elongated flexible spline in a window screen frame which reduces employee fatigue and which reduces lost productivity.

Yet another object of the invention is to provide an apparatus for seating an elongated flexible spline in a window screen frame which permits an increase in the diameter of the spline thereby resulting in a more durable product.

Still another object of the invention is to provide an apparatus for seating an elongated flexible spline in a window screen frame which results in a product having a tight uniform screen.

Still another object of the invention is to provide a device of the type described above which is economical of manufacture, durable in use and refined in appearance.

These and other objects will be apparent to those skilled in the art.

SUMMARY OF THE INVENTION

Figure 1:
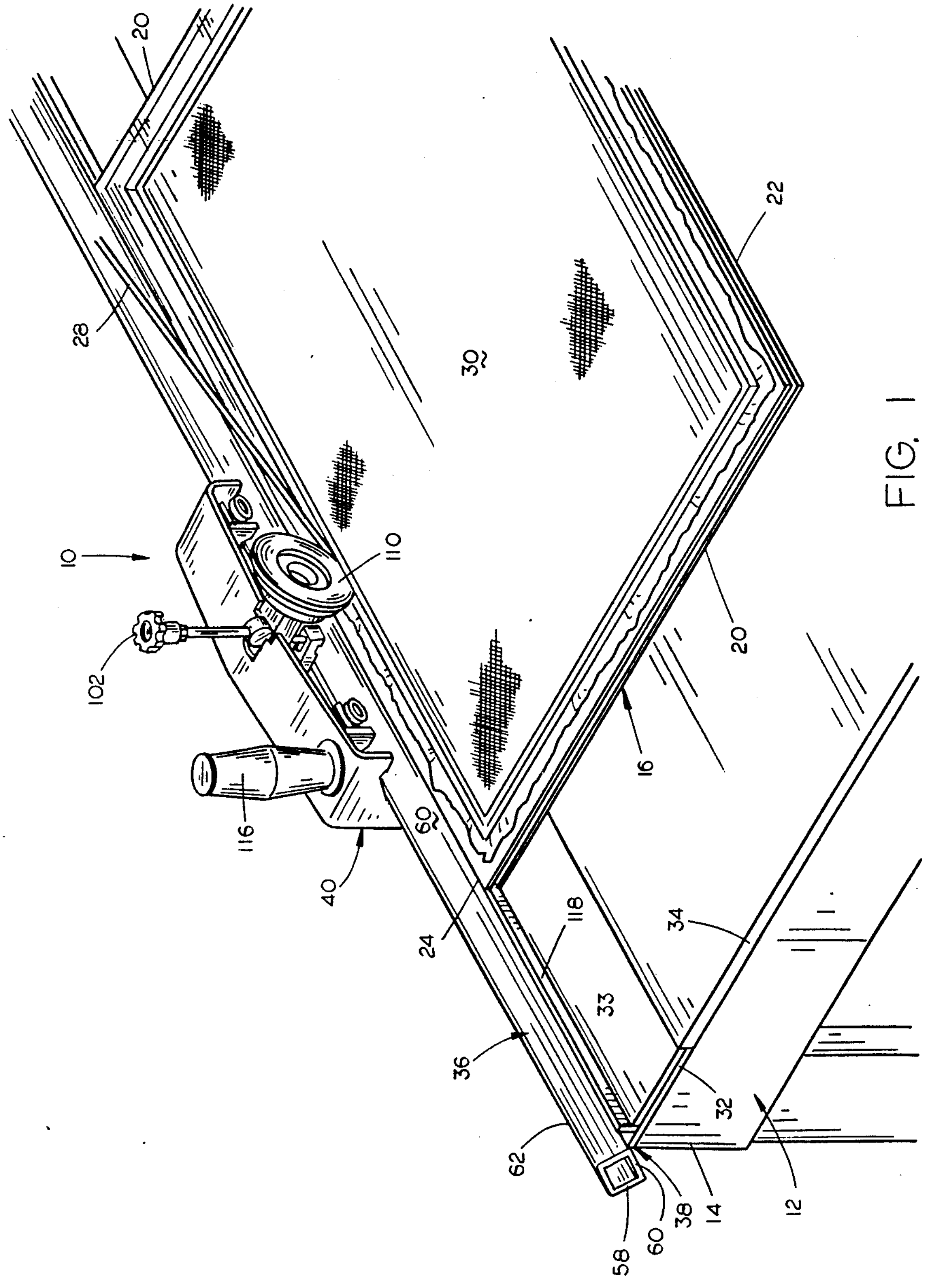
FIG. 1 is a perspective view illustrating the apparatus of this invention being employed to seat a flexible spline in the frame of a window screen.
Figure 2:
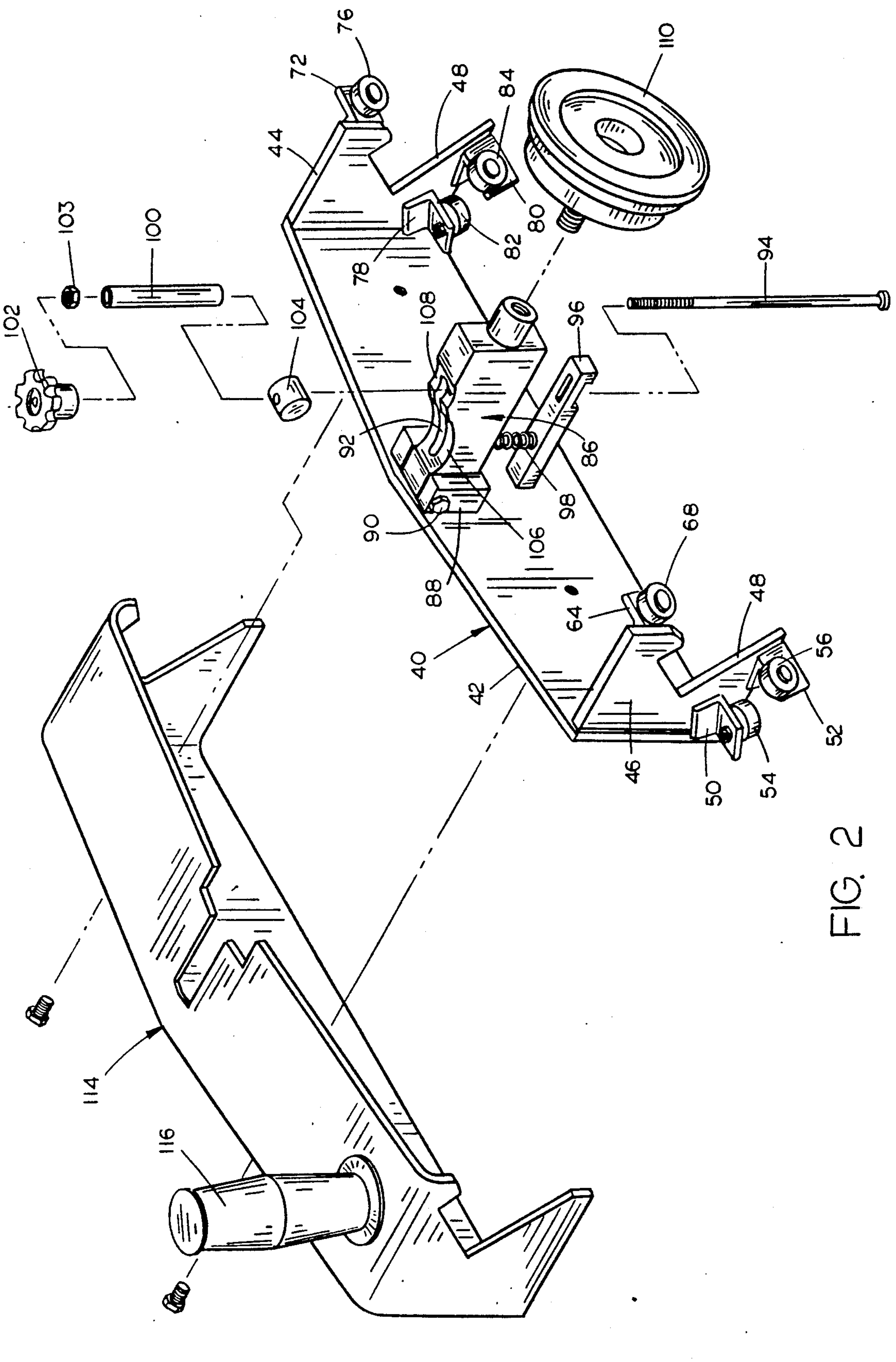
FIG. 2 is an exploded perspective view of the apparatus of this invention.

An apparatus is described which enables the positioning or seating of an elongated flexible spline in the groove of a window screen frame to secure the flexible screen material thereto. A table means is provided which includes a substantially horizontally disposed top surface having at least one side edge. An elongated support member is secured to the table adjacent the one side edge thereof and has a carriage means selectively longitudinally movably mounted thereon. A spline roller is rotatably mounted on the carriage means and is movable between a raised inoperative position and a lowered operative position. When the spline roller is in its raised inoperative position, one side of the screen frame may be positioned therebelow. The screen material is layered over the frame and the elongated flexible spline is positioned over the groove provided in the screen frame. The spline roller is then lowered to its operative position so that it forces the spline and the screen material downwardly into the groove of the screen frame. The carriage means is then moved longitudinally with respect to the screen frame so that the spline is progressively inserted into the groove along the entire length of that side of the frame.

DESCRIPTION OF THE PREFERRED EMBODIMENT

The apparatus of this invention is referred to generally by the reference numeral 10 and which is positioned at one side of an elevated table 12 having at least one side edge 14. The numeral 16 refers to a conventional window screen frame which is normally comprised of an aluminum material. Frame 16 includes a top frame member 18, bottom frame member 20, and side frame members 22 and 24. Each of the frame members 18, 20, 22 and 24 are provided with a groove 26 formed in the outer surface thereof adapted to receive an elongated flexible spline 28 so that the screen material 30, which is normally a fiber mesh material 30, may be secured to the frame 16 to create the window screen.

Apparatus 10 includes an elongated flat plate 32 which is secured to the top surface of table 12 at side edge 14 by screws or the like and which is covered with a resilient material 33. A sheet of plywood or the like 34 is also secured to the top surface of table 12 so that the upper surface of resilient material 33 will not project above the remaining top surface of the table. An elongated metal tube 36 is secured to the outer end of plate 32 by welding and is disposed as seen in FIG. 1. For purposes of description, plate 32 and tube 36 form support 38.

The numeral 40 refers to a carriage or support means which is movably mounted on the tube 36 as will now be described in detail. Carriage 40 includes an outer plate member 42 having end plates 44 and 46 secured to the opposite ends thereof which extend inwardly towards the table 12. As seen in the drawings, each of the end plates 44 and 46 is provided with a cut-out portion 48 adapted to receive the tube 36.

Outer brackets 50 and 52 are secured to the outer surface of end plate 46 and have rollers 54 and 56 mounted thereon respectively which engage sides 58 and 60 respectively of tube 36. Inner brackets 62 and 64 are mounted on the inner surface of end plate 46 and have rollers 66 and 68 rotatably mounted thereon respectively. Rollers 66 and 68 rollably engage sides 60 and 62 of tube 36 respectively.

Outer brackets 70 and 72 are mounted on the outer surface of end plate 44 and have rollers 74 and 76 rotatably mounted thereon respectively which engage sides 60 and 62 of tube 36. Inner brackets 78 and 80 are secured to the inner surface of end plate 44 and have rollers 82 and 84 rotatably mounted thereon which rollably engage the sides 58 and 60 of tube 36.

Figure 3:
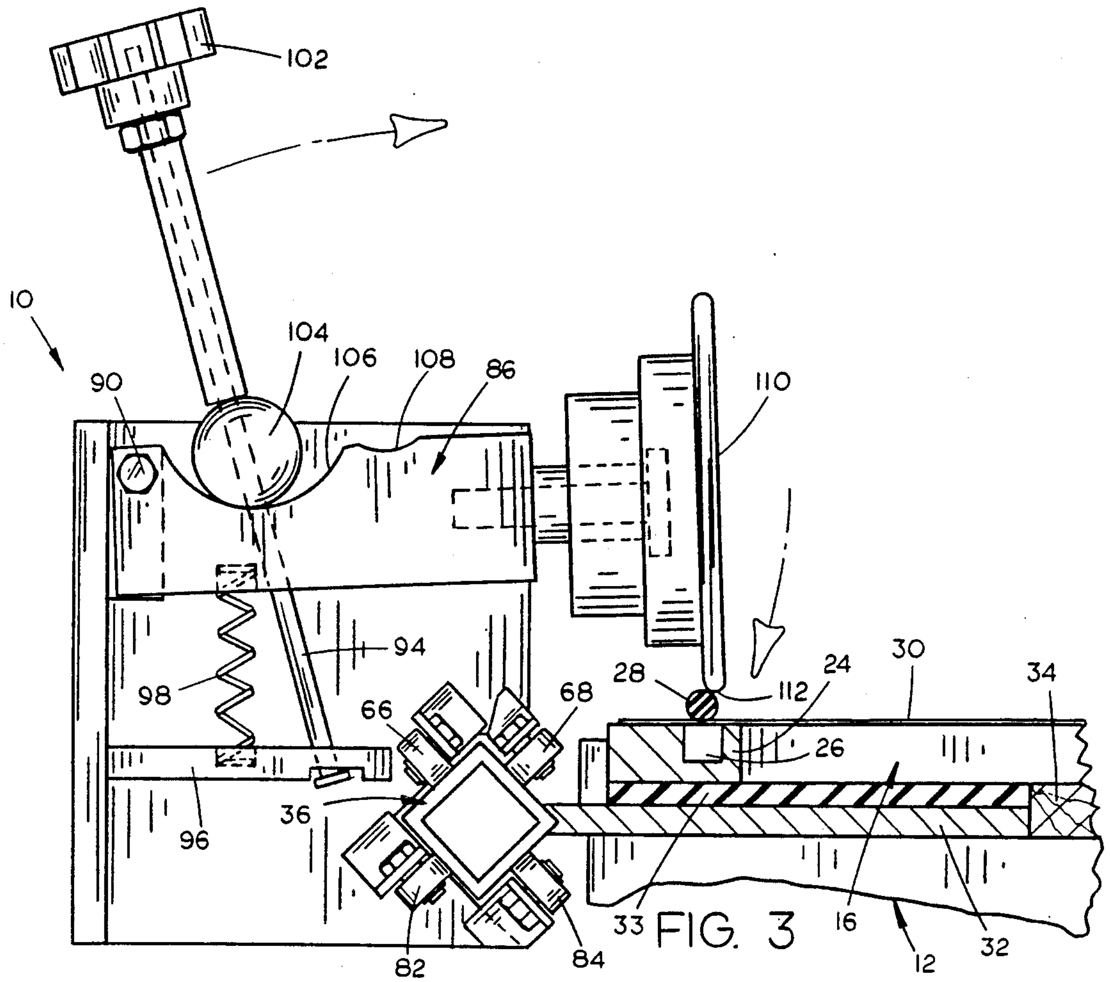
FIG. 3 is an end view of the apparatus of this invention in an inoperative position.
Figure 4:
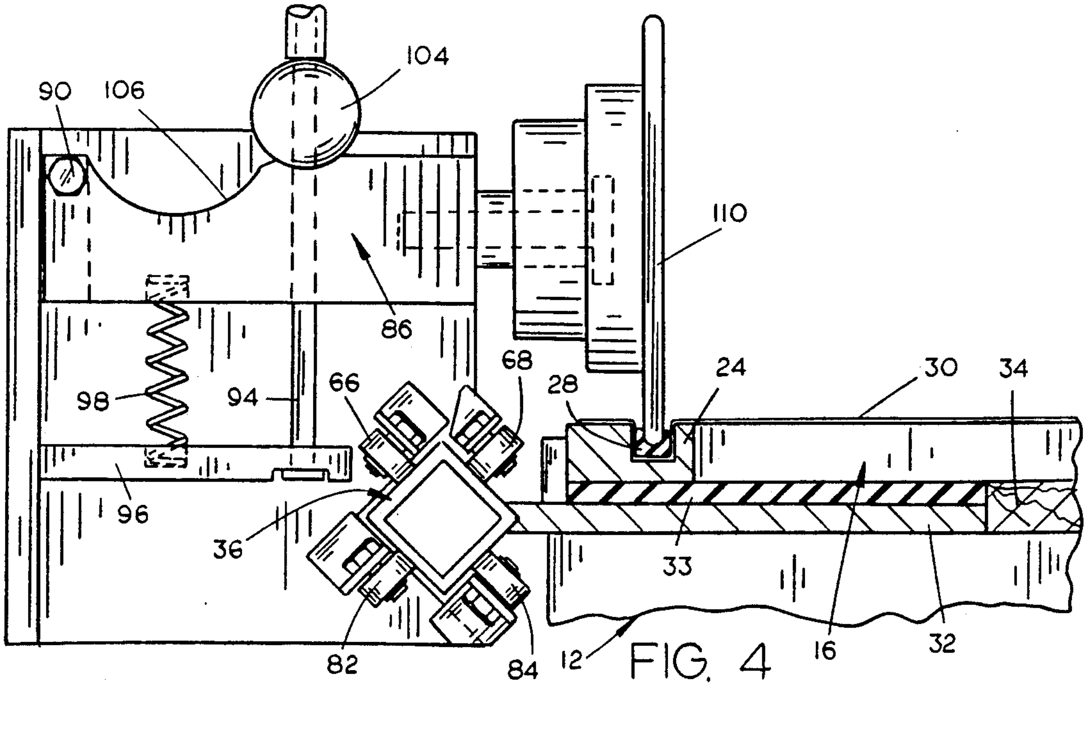
FIG. 4 is a view similar to FIG. 3 except that the spline roller has been lowered to an operative position.
Figure 5:
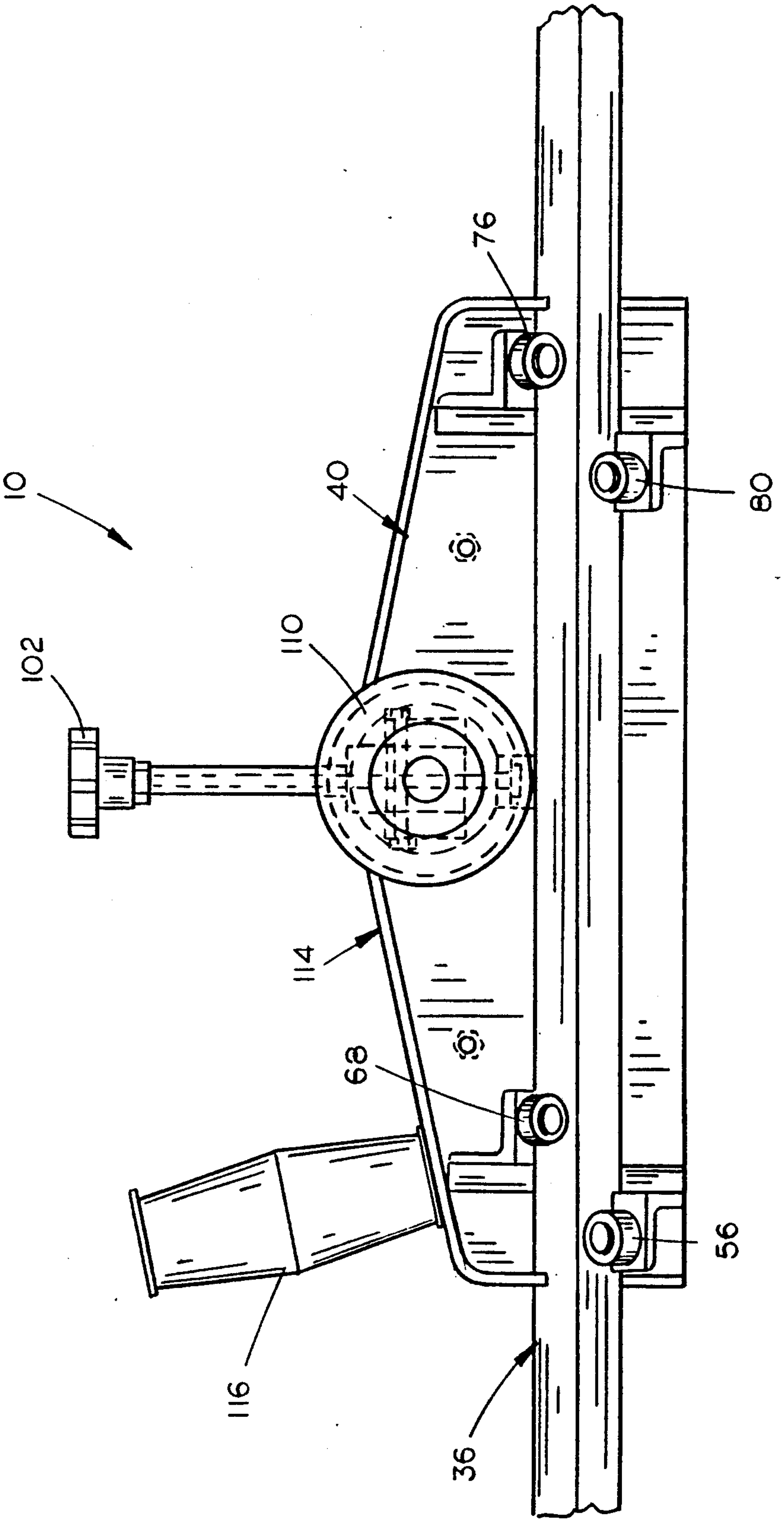
FIG. 5 is a side view of the apparatus.

Arm 86 is pivotally secured, about a horizontal axis, to bracket 88, by bolt 90 as seen in the drawings. Arm 86 is provided with a vertically disposed slot 92 formed therein through which extends bolt or rod 94. The lower end of rod 94 is pivotally received by the outer end of arm 96 which is secured to the inner surface of outer plate member 42 and which extends horizontally inwardly therefrom. Spring 98 has one end positioned or secured to arm 96 as seen in the drawings and has its upper end in engagement with the underside of arm 86 to yieldably urge arm 86 upwardly with respect to arm 96. Sleeve 100 is mounted on the upper end of rod 94 and is held in position by means of an adjustment knob 102 and nut 103 threadably mounted on the upper end of rod 94. Cylindrical member 104 is positioned on the rod 94 below the lower end of sleeve 100 and is adapted to engage the two cam surfaces 106 and 108 formed in the upper end of arm 86. When cylindrical member 104 is positioned in cam surface 106, as viewed in FIG. 3, arm 86 will be in its upper inoperative position. When cylindrical member 104 is positioned in the cam surface 108, as viewed in FIG. 4, arm member 86 is positioned in its lower operative position. The cylindrical member 106 is selectively moved between the cam surfaces 106 and 108 by simply grasping the adjustment knob 102 and moving the same towards the table or away from the table.

Roller 110 is rotatably mounted on the inner end of arm 86 and has a peripheral surface 112 which is adapted to be received in the groove 26 to force the spline 28 downwardly thereinto to secured the flexible screen material 30 to the frame. Cover 114 is mounted on carriage 40 and has a handle 116 extending upwardly therefrom.

When it is desired to secure the screen material 30 to the screen frame 16, the roller 110 is positioned in its upper inoperative position. The screen frame 16 is placed adjacent the upstanding member 118 at one side of the table 12 as seen in FIG. 1. The screen material 30 is layered over the screen frame and the spline 28 is positioned over the groove 26 at the side of the frame. Carriage 40 is then moved to the end of the side frame and the roller 110 is moved from the position of FIG. 3 to the position of FIG. 4 so that the periphery of the roller forces the spline 112 and the screen material 30 downwardly into the groove 26. The carriage 40 is then moved from end of the side frame of the screen to the other end with the spline 28 being progressively forced downwardly into the groove 26 by the roller 110 as the carriage is so moved. When the carriage reaches the end of the frame member, for example frame member 24, roller 110 is moved to its upper inoperative position and the screen frame is rotated 90° so that frame member 20 is adjacent the member 118. The roller 110 is then again lowered into its operative position so that the spline will be forced downwardly into the groove in the frame member 20. The procedure is repeated until the spline has been positioned in the groove around the entire screen frame. Once the spline 28 has been properly positioned, excess screen material 30 is trimmed with a razor blade or the like.

Thus it can be seen that a novel apparatus has been provided for positioning a flexible spline in a window screen frame to secure the flexible screen material to the frame. It can also be seen that the apparatus of this invention is convenient to use and does not require excessive strength to seat the spline in its respective groove. It can therefore be seen that the invention accomplishes at least all of its stated objectives.

I claim:

1. An apparatus for seating an elongated flexible spline in the screen retaining groove of a screen frame to secure flexible screen material thereto, comprising,

- a table means including a substantially horizontally disposed top surface having at least one side edge,
- an elongated support means secured to said table means at said one side edge,
- a carriage means selectively longitudinally movably mounted on said support means,
- a spline roller means rotatably mounted on said carriage means and being selectively movably mounted on said carriage means between a raised inoperative position and a lowered operative position,
- said spline roller means, when in its said inoperative position, permitting the window screen frame to be positioned therebelow adjacent said side edge of said table means,
- said spline roller means, when in its said operative position, engaging the spline to force the spline downwardly into the groove of the window screen frame whereby the flexible screen material positioned between the spline and the screen frame will be secured to the screen frame,
- said spline roller being rotatably mounted on the end of an elongated arm which is pivotally secured, about a horizontal axis, to said carriage means, said arm means being selectively movable between an upper inoperative position and a lower operative position, said arm means having first and second cam surfaces formed in its upper end, an elongated rod means having a lower end operatively pivotally secured to said carriage means and extending upwardly therefrom adjacent said cam surfaces, a cam follower mounted on said rod means for engagement with said cam surfaces, the pivotal movement of said rod means, with respect to said carriage means, causing said cam follower to move between said cam surfaces thereby moving said arm means and said spline roller between said operative and inoperative positions.

* * * * *